April 2, 1935.   B. POLL   1,996,686
TRANSPLANTER
Filed April 6, 1931   4 Sheets-Sheet 4
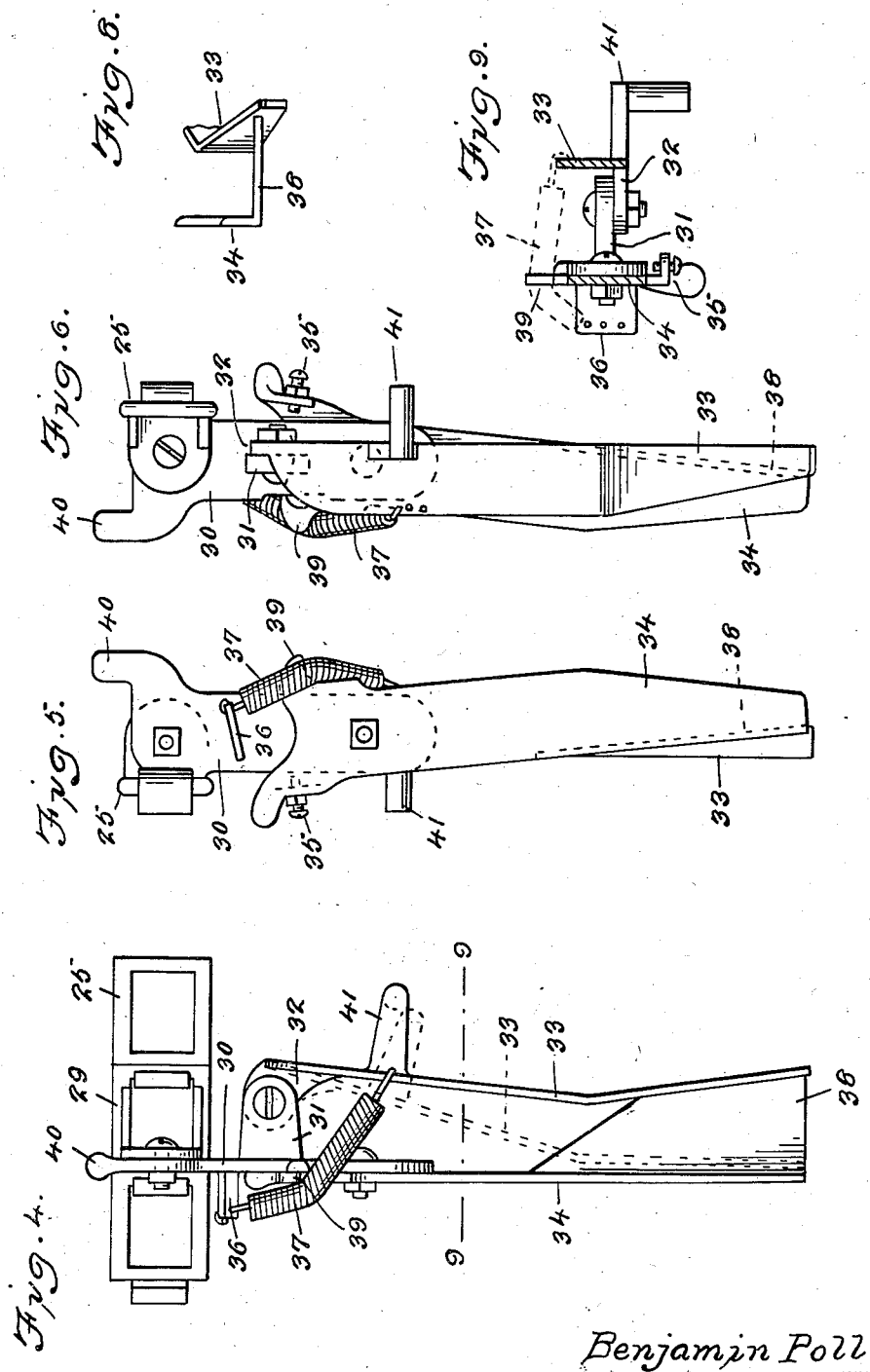
Benjamin Poll
INVENTOR
BY Victor J. Evans and Co.
ATTORNEYS Patented Apr. 2, 1935

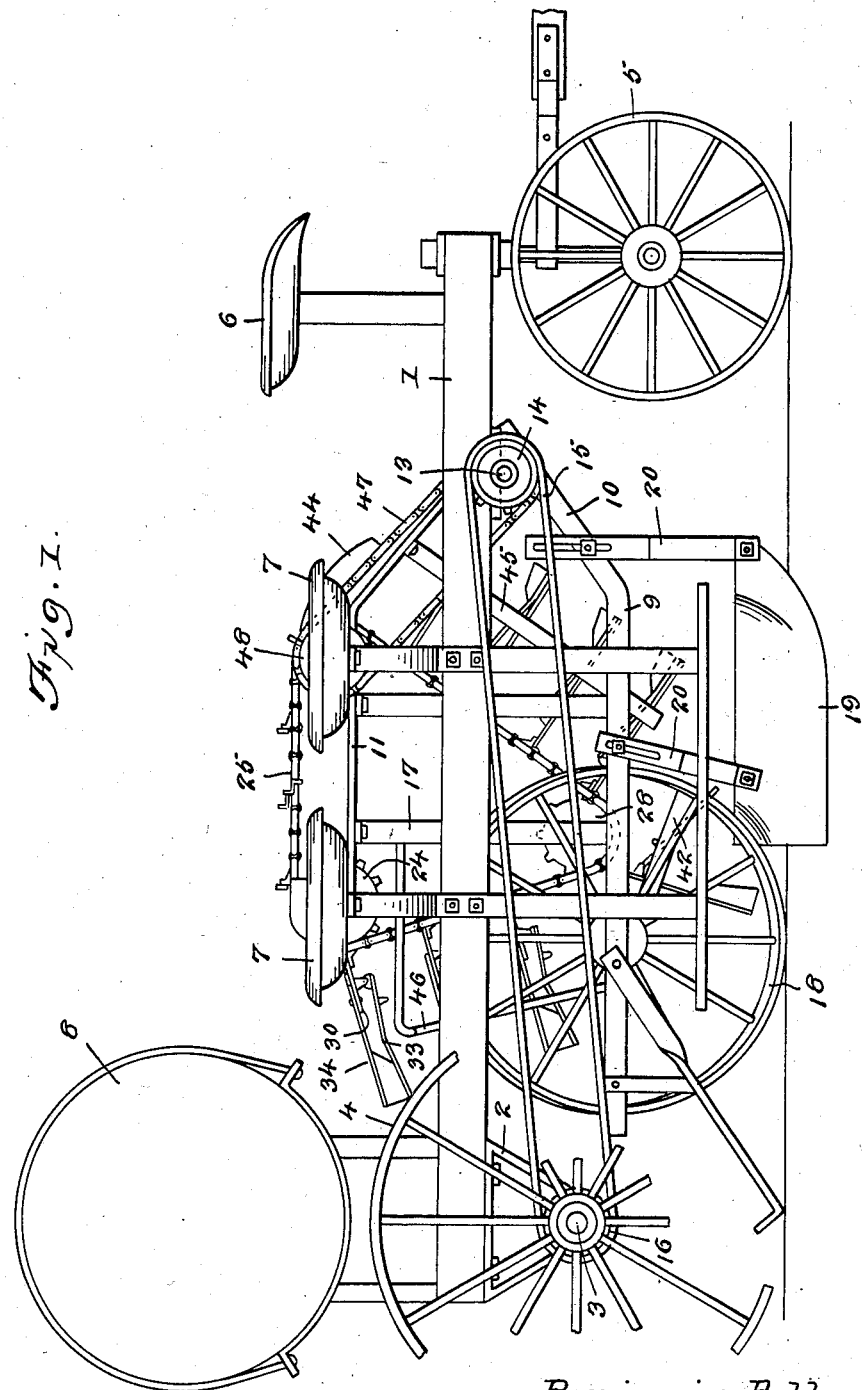

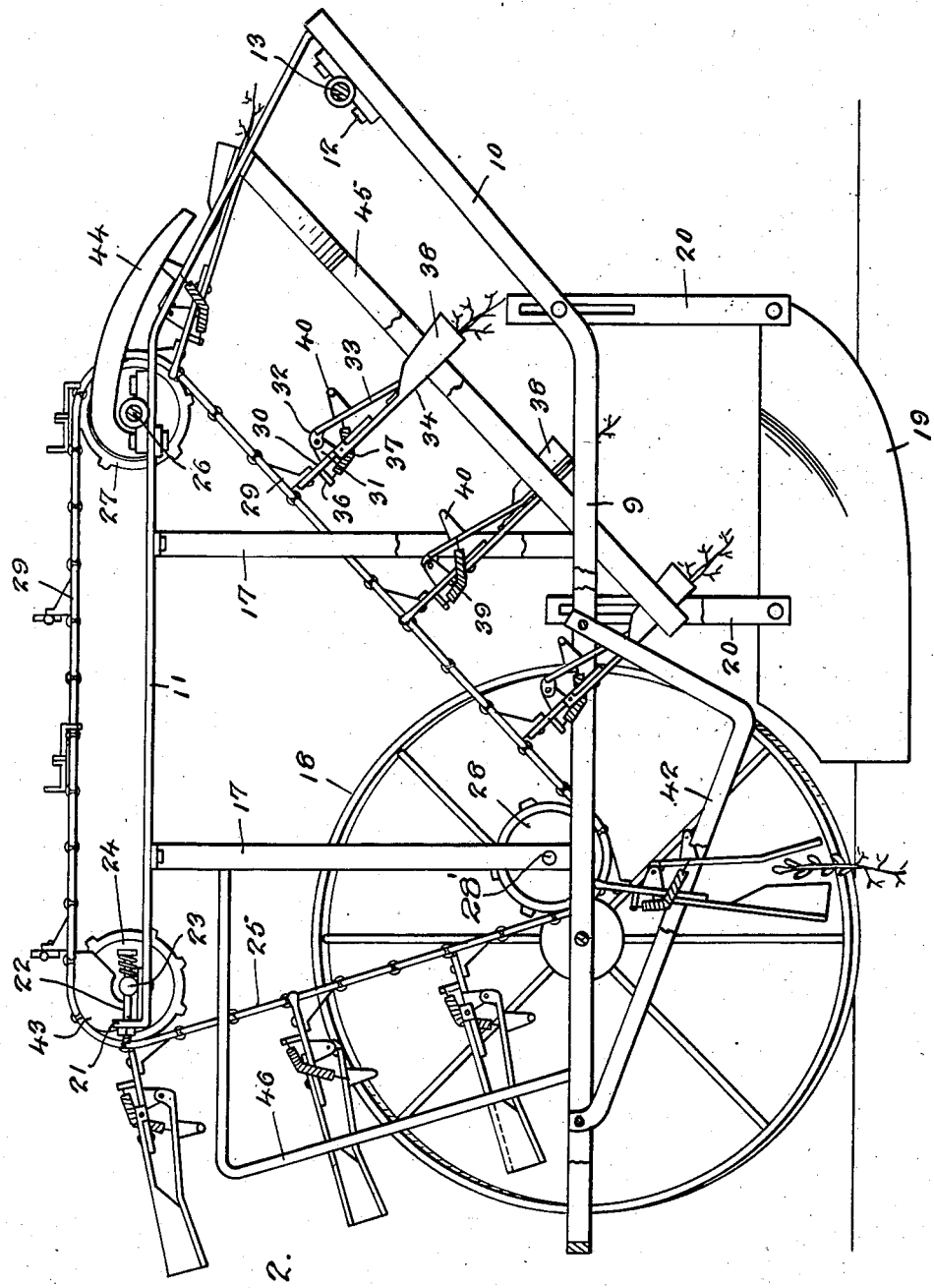

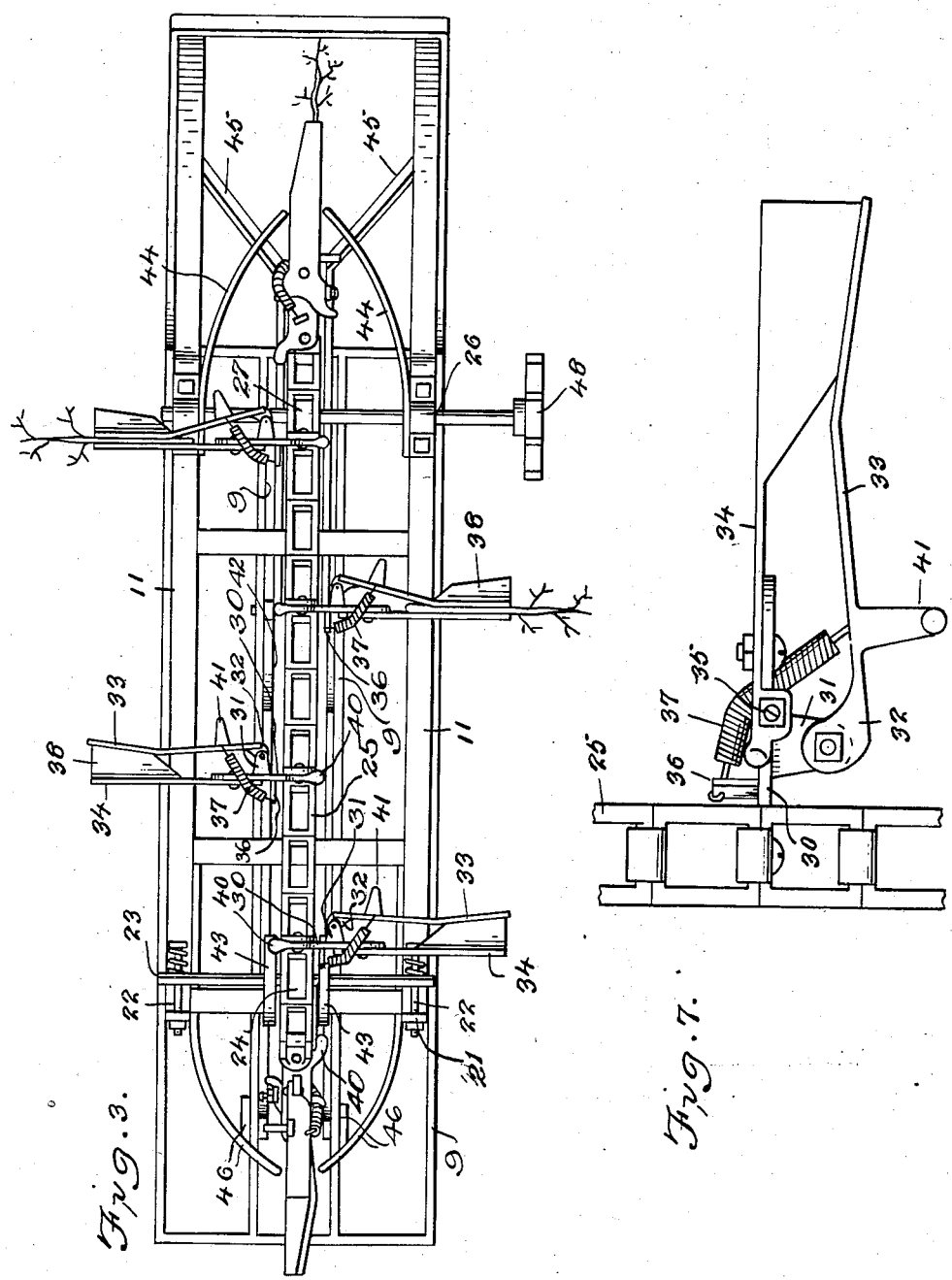

1,996,686

UNITED STATES PATENT OFFICE 1,996,686

TRANSPLANTER

Benjamin Poll, Holland, Mich.

Application April 6, 1931, Serial No. 528,111

4 Claims. (Cl. 111—3)

This invention relates to transplanters, and its general object is to provide a transplanting machine which is capable of planting or setting plants of all kinds and includes a plant handling means that receives the plants from the operators, and will hold the plants during their travel to a releasing means which releases the same for planting, and this operation is accomplished in a manner whereby the plants are not only handled expeditiously but without fear of bruising, breaking or damaging.

A further object of the invention is to provide a transplanter which includes a plant handling and carrying means having cam means for manipulating the same at intervals in the travel thereof and some of said cam means are adapted for disposing the plant receiving and carrying means in opposed directions whereby they can be conveniently fed with plants by operators seated upon opposite sides of the machine.

Another object of the invention is to provide in a transplanter, a plant handling means that is extremely convenient for the operators to feed, with the result extreme care does not have to be exercised in feeding the means which is thence automatic in its operation, and said means together with its mounting means is simple in construction, reasonably inexpensive to manufacture and extremely efficient in operation and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a side elevation of a transplanter constructed in accordance with the present invention.

Figure 2 is a side elevation of my transplanting device per se and showing the same removed from the wheeled frame therefor.

Figure 3 is a top plan view thereof.

Figure 4 is a top plan view of one of my plant holding and carrying devices in open position.

Figure 5 is a view of one side thereof.

Figure 6 is a similar view of the opposite side.

Figure 7 is a bottom plan view of Figure 4 showing the carrying chain broken away.

Figure 8 is a fragmentary end view of the plant holding and carrying means in open position.

Figure 9 is a sectional view taken approximately on line 9—9 of Figure 4, with the chain removed.

Referring to the drawings in detail, the reference numeral 1 indicates the frame of my transplanter and this frame is preferably rectangular in formation. Depending from the sides of the frame are suitable bracket means 2 which are provided with bearings to receive the rear axle 3 that has keyed or otherwise secured thereto the rear wheels 4. Journaled in the forward end of the frame 1 is a standard having secured to its lower end in any appropriate manner an axle which receives the front wheels 5, the latter being the usual caster wheels as will be apparent, and this standard has also secured thereto means for receiving the tongue as shown in Figure 1. Secured to the frame and rising therefrom are supporting means for the driver's seat 6, and fixed to the side members of the frame are supporting members which accommodate seats 7 for the operators which feed the plants to the plant receiving and holding means which will be presently described. It will be noted that I have shown two operators' seats in Figure 1, but in fact there are four of these seats, two on each side of the frame. I have also illustrated the water reservoir 8 and of course this reservoir has suitably connected thereto a hose or the like whereby water is fed to a suitable means for conveying the water to the plants prior to the latter being covered with earth as will be apparent.

In Figure 2 of the drawings, I have illustrated the planting unit which in fact forms the subject matter of the present invention, and this unit includes a frame made up of parallel arranged strips 9 which for distinction are referred to as the lower strips, and the said lower strips have their forward ends inclined upwardly as at 10. These inclined portions have their upper ends secured to strips 11 which I refer to as upper strips, and the strips 11 have their forward ends inclined downwardly while the remaining portions are arranged horizontally.

Secured to the inclined portions 10 are bearing brackets 12 which receive a shaft 13 and this shaft has fixed to its outer end a sprocket gear 14 that has trained thereabout a sprocket chain 15, the latter being likewise trained about a sprocket gear 16 which is secured to the rear axle 3, with the result the shaft 13 is driven in accordance with the travel of the rear wheels, and the shaft 13 also acts in the capacity as a pivot means for the planting unit so that the latter will be free to move in accordance with the irregularities of the ground during the travel of the machine.

The strips 9 and 11 are supported in spaced relation with respect to each other through the medium of upright strips 17 and suitably supported between the strips 9 and arranged in suitable guide-ways included in the unit frame, as well as mounted for rotation are a pair of ground engaging wheels 18 that are arranged in divergent relation with respect to each other and act in the capacity as packing wheels.

In other words, the arrangement of these wheels is such that they pack the soil about the plant after the same is deposited in the furrow and the latter is provided by furrow opening shares 19 which are adjustably mounted through the instrumentality of bracket members 20 that are slotted, and arranged in the slots are bolt and nut connections which secure the brackets 20 to the strips 9 as best shown in Figure 1. The furrow opening shares are disposed in advance of the ground engaging wheels 18.

The rear ends of the strips 11 are disposed at right angles with respect thereto to provide ears 21 and these ears have apertures for receiving spring pressed bolts 22 that have secured thereto a shaft 23, the latter having mounted for rotation thereon a sprocket wheel 24 and by this construction, it will be apparent that the shaft is movable against the tension of the springs of the bolts 22 for the purpose of providing a chain tightener for the sprocket chain 25. Secured to the strips 11 adjacent the forward end of the horizontal portion thereof are bearing brackets within which is journaled a shaft 26 that has secured thereto a sprocket wheel 27, and a similar sprocket wheel 28 is mounted on a shaft 28' disposed between and secured in two parallel upright strips 17 at their lower ends, as best shown in Figure 2. The sprocket chain 25 is trained about the sprocket wheel 24, the sprocket wheel 27 and the sprocket wheel 28, and these wheels are disposed in a manner to give the line of travel of the sprocket chain 25 a substantial triangular configuration as will be noted upon inspection of Figure 2 there being an upper horizontal run, an inclined downward front run and an inclined upward rear run.

The sprocket chain 25 has arranged at intervals thereon the plant receiving and carrying means which forms the most important element of the present invention and it will be noted that these plant receiving and carrying means are disposed in equi-distantly spaced relation with respect to each other. The links of the chain which carry the plant receiving and carrying means are indicated by the reference numeral 29 and these links are formed with apertured ears which have pivotally secured thereto shanks 30, the latter being provided with tongues 31 extending at right angles thereto and the tongues pivotally receive ears 32 of the plant holding arms 33. Cooperating with the arms 33 are arms 34 which are secured to the shanks 30 in a manner whereby they can be adjusted laterally with respect to the shanks and held in adjusted position through the instrumentality of set screws 35. The shanks 30 are provided with lugs 36 which have formed therein a plurality of openings arranged in spaced relation with respect to each other for the purpose of receiving one of the ends of a coil spring 37 while the opposite end of this coil spring is adapted to be received in any one of a plurality of openings formed in its plant receiving arm 33. The arms 34 have formed with their free ends flanges 38 and the flange of each of the arms 34 cooperates with its companion arm 33 for the purpose of providing a plant receiving pocket as best shown in Figure 4. The coil spring 37 is received intermediate its ends by a stop 39 which disposes the spring in bent relation whereby the latter will urge the plant holding arms 33 into contacting engagement with their companion arms 34.

The free ends of each of the arms are tapered as best shown in Figure 6. Due to the fact that the plant receiving and carrying means is pivotally secured to the links that receive the same, they are movable so as to be disposed at right angles with respect to the sprocket chain 25, but the mounting allows the plant receiving and holding means to be moved in opposed directions with respect to each other, as the shanks 30 are each provided with a finger 40 arranged at the secured ends thereof to engage the links, therefore the arms are movable only in one direction and the mounting is such that every other set of arms is movable in opposed directions. Formed with and extending from the plant holding arms are right angle disposed fingers 41 that extend a considerable distance beyond the arms 33, as will be noted upon inspection of Figure 6, for a purpose which will be presently apparent.

Secured to the strips 9 and arranged in spaced parallel relation with respect to each other are what I term cam strips 42 and these strips 42 are provided with upwardly inclined forward portions, while the body portions of the strips 42 are inclined slightly to the rear end of the unit as best shown in Figure 2. Fixed to the frame and arranged upon opposite sides of the sprocket wheel 24 are cam members 43, and secured to the bearing brackets within which is journaled the shaft 26 are forwardly directed cam members 44, the latter being curved toward each other and downwardly as best shown in Figures 2 and 3 for the purpose of directing the plant receiving and carrying means between strips 45 that have their upper portions disposed in converging relation with respect to each other while their remaining portions are parallel and are secured to the frame in a manner to be directed at an inclination downwardly and rearwardly toward the ground engaging wheels 18 as best shown in Figure 2. These strips 45 provide what may be termed a guide-way for the plant receiving and carrying means and guide the latter during the forward run thereof, while the rearward run is provided with guide means in the form of curved angle bent strips 46 that are disposed toward each other as best shown in Figure 3, and the curved strips 46 have their ends secured to the upright strips 17 and the strips 9.

From the above description and disclosure of the drawings, it will be obvious that I have provided a transplanting machine that may be drawn by any well known draft means such as a tractor or the like, and the wheels 4 not only act in the capacity as supporting wheels for the frame 1, but also rotate the axle 3 which in fact is a drive shaft for operating the mechanism of the transplanter, through the medium of the sprocket gears 14 and 16 and the sprocket chain 15, and the shaft 13 has secured thereto a sprocket gear 70 which has trained thereabout a sprocket chain 47, the latter being also trained about a sprocket gear 48 that is secured to the shaft 26 whereby this last mentioned shaft will be rotated for driving the sprocket wheel 27 so that the sprocket chain 25 will be driven accordingly, to move the plant receiving and carrying means.

The plant receiving position of the plant receiving and holding means is clearly shown in Figure 3, and it will be noted that the said means are alternately arranged in opposed relation with respect to each other and horizontally in a plane substantially parallel with the upper horizontal run of the chain 25, with the clamp holding arms 30 engaging the outer side edge of the flange 38, so that the pockets will be opened for receiving the plants.

When the plant receiving and holding means have the pockets thereof arranged in open position, the operators that are seated upon the seats 7 deposit plants within the pockets, and disengage the arms 33 from the outer side edge of the flanges 38, thereby closing the pockets so that the arms 33 and 34 will hold the plants during the travel of the plant receiving and holding means from the time the plants are deposited therein, to the time that they are released. The releasing action will be presently described. After the plants have been deposited in the plant receiving and holding means by the operators, the said means are carried by the chain 25, until they reach the cam members 44 which are arranged in the path of the said means. The plant receiving and holding means engage the cam members 44 which act as guides therefor, and due to the downwardly and inwardly curved arrangement of the cam members 44, they will dispose the plant receiving and holding means at right angles to the plane of travel of the inclined downward front run of the chain 25, as the plant holding and receiving means are advanced by the movement of the chain, as will be apparent upon inspection of Figure 3.

The strips 45 guide the plant receiving and holding means in their downward movement and until they reach the cam strips 42, at which time the said means will be disposed between the cam strips 42 and the fingers 41 will engage the cam strips 42 which will result in the plant holding arms 33 being moved to an open position as best shown in Figure 2 for releasing the plants from the pockets so that the latter will be deposited in the furrow provided by the furrow opening shares 19. After the plants have been deposited, the ground engaging wheels will pack the soil about the same.

Due to the coil springs 37, the plant holding arms are urged to a closed position, after they leave the cam strips 42, but the flanges 38 are disposed in the path of the plant holding arms 33 and therefore the arms cannot be entirely closed with the result the pockets remain open during the upward travel of the plant receiving and holding means between the curved strips 46. It will be noted that the said means are still arranged at right angles with respect to the plane of travel of the chain 25 during their upward travel movement on the inclined upward rear run of the chain but as soon as the said means reach the cam members 43, the fingers 40 engage the said cam members 43 and cause the plant receiving and holding means to drop to the horizontal position as shown in Figure 3 and it will be noted that the pockets are still open or in plant receiving position, so that the operators can place the plants within the pockets as has been previously set forth.

While the arms 33 are provided with spring means for urging the latter toward the arms 34, the arrangement of the spring is such that the pressure is not very great upon the plants, with the result the plants are not bruised, broken or damaged in any way during their travel through the machine, and until they are deposited in the soil as shown in Figure 2, therefore my transplanter will not only expeditiously set out plants, but rapid growth thereof will be assured.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. In a transplanter, a sprocket chain mounted for travel, plant receiving and carrying means pivotally secured to the sprocket chain and being mounted for alternate movement in opposed directions with respect to each other, a shank included in each of the plant receiving and carrying means, a stationary arm mounted for adjustment upon said shank, a tongue secured to said shank, an arm pivotally secured to the tongue, a flange formed with the stationary arm and cooperating with the pivoted arm to provide a pocket, a spring having connection with the pivoted arm for putting the latter under tension, said spring being adapted to hold the pivoted arm in closed position or in open position against said flange.

2. In a transplanter, a planting unit comprising a pivotally mounted frame, packing wheels carried by said frame, furrow providing shares adjustably mounted with respect to said frame, sprocket wheels mounted for rotation and carried by said frame, a chain trained about the sprocket wheels, means for rotating one of said sprocket wheels for driving said chain, plant receiving and carrying means pivotally secured to said sprocket chain and arranged in spaced relation with respect to each other, each of said means including a shank, a link for each of the shanks and forming parts of the chain, an ear formed with each of said links for pivotally receiving its shank, a stationary arm included in each of the plant receiving and carrying means, and adjustably secured to its shank, a flange for each of the stationary arms, a spring pressed arm for each shank and pivotally secured with respect thereto, the spring pressed arms cooperating with the stationary arms and flanges to provide plant receiving pockets, and cam means carried by the frame and arranged at intervals in the path of the travel of the chain to act upon the plant receiving and carrying means for operating the latter to and from their plant receiving and releasing positions.

3. A transplanter comprising a wheeled frame, a frame pivotally secured within the frame first mentioned and including upper and lower strips having their forward ends secured together, upright strips secured to the upper and lower strips and supporting the latter in spaced relation with respect to each other, sprocket wheels carried by the pivoted frame, a sprocket chain trained about the sprocket wheels for disposal in substantially triangle formation to provide an upper horizontal run, and an inclined downward front run, and an inclined upward rear run, plant receiving and carrying means pivotally secured to the sprocket chain and including means to provide plant receiving pockets, cam means arranged adjacent the ends of the runs of the chain and arranged in the path of the plant receiving and carrying means to act upon the same, the cam means arranged adjacent the end of the inclined downward front run being adapted to dispose the plant receiving and carrying means in open or plant releasing position, the cam means arranged adjacent the end of the inclined upward rear run being adapted to dispose the plant receiving and carrying means in plant receiving position, and the cam means disposed at the end of the upper horizontal run being adapted to arrange the plant receiving and carrying means into a position whereby the latter can be received by the plant releasing cam means.

4. In a transplanter, a pivotally mounted frame, sprocket wheels carried by said frame, a chain trained about said sprocket wheels and arranged in substantially triangle formation to provide an upper horizontal run, an inclined downward front run, and an inclined upward rear run, plant receiving and carrying means pivotally secured to said chain in a manner whereby they are mounted for alternate movement in opposed directions with respect to each other, a shank included in each plant receiving and carrying means, a stationary arm secured to said shank, an arm pivotally secured with respect to said shank and cooperating with the stationary arm, a flange formed with the stationary arm and cooperating with the pivoted arm to provide a plant receiving pocket, spring means for urging the pivoted arm in one direction to close the pocket, and cam means arranged adjacent the ends of the runs of the chain to act upon the plant receiving and carrying means for moving the latter in plant receiving position, then in a position for movement into a plant releasing position and thence to release the plants by disposing the pockets in open position.

BENJAMIN POLL.